United States Patent [19]
Hofmann et al.

[11] 3,912,816
[45] Oct. 14, 1975

[54] CERTAIN BACTERICIDAL TRIAMINE

[75] Inventors: Eberhard Hofmann, Essen-Bredeney; Ulrich Holtschmidt, Essen, both of Germany

[73] Assignee: Th. Goldschmidt AG, Essen, Germany

[22] Filed: Aug. 30, 1973

[21] Appl. No.: 393,187

Related U.S. Application Data

[63] Continuation of Ser. No. 107,443, Jan. 18, 1971, abandoned.

[30] Foreign Application Priority Data
Feb. 27, 1970 Germany........................... 2009276

[52] U.S. Cl. .................... 424/325; 252/107; 71/67
[51] Int. Cl.² ............................................. A01N 9/20
[58] Field of Search ........................... 424/325, 233

[56] References Cited
UNITED STATES PATENTS
2,638,450  5/1953  White et al. ......................... 106/14
3,108,036  10/1963  Molnar .............................. 424/233

FOREIGN PATENTS OR APPLICATIONS
845,941  8/1952  Germany

OTHER PUBLICATIONS
Chemical Abstracts, Vol. 75 (1971), p. 142159f.

*Primary Examiner*—V. D. Turner
*Attorney, Agent, or Firm*—Toren, McGeady and Stanger

[57] ABSTRACT

A biocidal composition comprises a biocidally effective amount of a compound of the formula

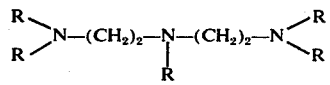

wherein R = H or $C_8H_{17}$, two of the R groups being $C_8H_{17}$, and an inert carrier, the pH of the composition being between about 5 to 8.

A method for disinfecting with the biocidal composition is also disclosed.

5 Claims, No Drawings

CERTAIN BACTERICIDAL TRIAMINE

CROSS REFERENCE TO PRIOR DISCLOSURE

This is a continuation of application Ser. No. 107,443 filed Jan. 18, 1971, and now abandoned.

FIELD OF INVENTION

The invention relates to the use of compounds of the foumula I

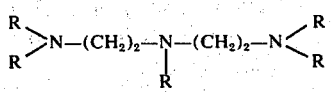

wherein $R = H$ or $C_8H_{17}$, two of the R groups being $C_8H_{17}$, as biocides, particularly bactericides and fungicides.

BACKGROUND INFORMATION AND PRIOR ART

Compounds of the structure of Formula I are known. U.S. Pat. No. 2,638,450 thus discloses the use of such amines as corrosion inhibitors.

German Pat. No. 812105 is concerned with the preparation of N-octyl-diethylenetriamino acetic acid, a biocidal agent. In this patent dioctyldiethylenetriamine is disclosed as an undesired by-product. The German patent in question describes, however, monooctyldiethylenetriamine as a starting product for N-octyldiethylenetriamino acetic acid, which, according to the patent, exhibits a strong anti-bacterial effect. The use of this starting product is indicated as particularly progressive.

SUMMARY OF THE INVENTION

It has now surprisingly been established that N-mono-octyldiethylenetriamine and N-mono-octyldiethylenetriamino acetic acid do not exhibit any significant bactericidal characteristics in econominically feasible concentrations, while, by contrast, N-dioctyldiethylenetriamine constitutes a superior biocidally active substance, even in relatively small concentrations. The superior bactericidal characteristics of N-dioctyldiethylenetriamine are maintained in the presence of large amounts of protein, soap and the like. It has also been established that a composition containing the compound, to wit, N-dioctyldiethylenetriamine, is in its insensitivity in respect to protein and anionic detergents by far superior to the commercially available surface active cationic detergents such as quaternary ammonium compounds or ampholytic soaps.

The excellent bacteriological activity of the composition containing the compounds to be employed in accordance with this invention, is most surprising, because substances of homologue nature, such as, for example, dilauryldiethylenetriamine are, from a practical point of view, without bacteriological effect, while, by contrast, mono-lauryldiethylenetriamine demonstrates a significant initial bacteriological effect. However, the bacteriological effect of the latter compound is negatively affected by the presence of protein and anionic detergents, so that from a practical point of view, the latter compound is by far inferior to a composition containing the compounds of this invention.

Surprisingly, it has also been established that the compound of the following formula II exhibits a significantly lesser bactericidal effect than the inventive compounds, although the compound of formula II has the same gross formula.

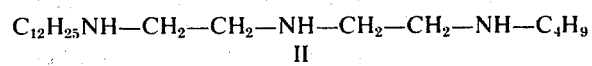

In addition to be above mentioned advantages, compositions containing the inventive compounds are also superior in comparison with, for example, mono-alkyldiethylenetriamines, since, in the preparation of the inventive compounds, no large excess of a reaction partner is required. Rather, corresponding to the reaction formula, molar quantity ratios should be used. The cumbersome removal of the diethylenetriamine excess, which is necessary in the preparation of mono-alkyldiethylenetriamine, is thus dispensed with in the preparation of the inventive compounds.

A still further advantage of the compounds to be used in the inventive composition resides in the fact that aqueous solutions of the compounds, which are prepared with admixture of acids, do not have any significant tendency for foaming. By adding small amounts of non-ionogenic tensides, a strong or weak foaming action can thus be adjusted at will. This, of course, is of great advantage for many applications. By contrast, in the prior art quaternary ammonium compounds and ampholytic soaps which have a strong foaming tendency, this can be accomplished only by the addition of large quantities of foam reducing agents, which makes the preparations uneconomical.

The compounds to be used in the inventive composition may be prepared in technically exceedingly simple manner by reaction of diethylenetriamine with, for example, n-octylchloride, n-octylbromide, or Di-n-octylsulphate in a mole ratio of 1 : 1 to 1 : 4, preferably 1 : 1.5 to 1 : 2.5, in the presence of acid acceptors and at temperatures of about 100° to 160°C.

A variety of acid acceptors may be used for this purpose, for example, NaOH, KOH, $Na_2CO_3$, $K_2CO_3$, CaO, $CaCO_3$, or the respective amine proper. The compounds to be used in accordance with the invention may be isolated from the reaction mixture, for example, by distillation. However, distillation or other procedures resulting in isolation, are unnecessary if technical purity is sufficient for the particular purpose.

For the purpose of preparing the inventive composition, the compounds are dissolved in a suitable solvent, such as water, alcohols, glycolethers or mixtures thereof, with the addition of acids which impart the final composition with a pH-value of about 5 – 8.

Suitable acids for this purpose are acetic acid, lactic acid, tartaric acid, citric acid, gluconic acid, hydrochloric acid, phosphoric acid, and nitirc acid, the amount of acid to be added being such that the desired pH-value of from between 5 – 8 is attained.

With a view to regulating the foaming behavior, non-ionogenic tensides may be added, such as, for example, the addition products of ethyleneoxide to laurylalcohol, isotridecylalcohol, isooctylphenol, nonylphenol and fatty acid glycerides, the copolymerisates of ethyleneoxide and propylene oxide, oxyethylated fatty acid amides and amines, provided their non-ionogenic character is dominant. Further, the inventive compositions may be admixed with thickeners, such as methyl-, hydroxyethyl- and carboxymethylcellulose, polyacrylic acid and their derivatives, polyvinylpyrrolidor and polyvinylalcohol as well as inert fillers such as highly dispersed silica, aluminum oxide, zinc sulfide, titanium dioxide, urea, cane sugar and cellulose.

The inventive compositions are particularly suitable as disinfectants, preservatives and algicides. They may thus be used in breweries, dairies, the alcohol-free beverage industry, animal breeding enterprises, slaughtering plants, hospitals and public baths.

The invention will now be described by several examples, it being understood, however, that these examples are given by way of illustration and not by way of limitation and that many changes may be effected without affecting in any way the scope and spirit of the invention as recited in the appended claims.

EXAMPLE 1

Preparation of N-dioctyl-diethylenetriamine

This experiment was carried out in a 2 liter three-neck flask fitted with stirrer, reflux cooler and thermometer. 2 mole of octylchloride, 1 mole of diethylenetriamine, 5 ml of water and 2 mole of NaOH were added to the flask and the mixture thus obtained was heated for 5 hours to a temperature of 130° to 140°C. While still hot, the liquid was decanted from the inorganic residue, and the decanted liquid was subjected to fractional vacuum distillation. Diethylenetriamine and mono-octyldiethylenetriamine were removed first by the distillation, whereafter, at a temperature of 130°–150°C and a pressure of 0.2 to 1 mm Hg, 135 gram of pure N-dioctyldiethylenetriamine were recovered.

Elementary Analysis

| Calculated for $C_{20}H_{45}N_3$ (mole weight 327): | Found: |
|---|---|
| C : 73.5% by weight | C : 73.9% by weight |
| H : 13.7% by weight | H : 13.9% by weight |
| N : 12.8% by weight | N : 12.5% by weight |

EXAMPLE 2

10 parts by weight of N-dioctyl-diethylenetriamine, 10 parts by weight of an addition product of 12 mole of ethylene oxide to 1 mole of isotridecylalcohol, 10 parts by weight of acetic acid and 70 parts by weight of water are homogenized under stirring and heating to a temperature of about 50°C. A yellow colored, clear and foaming solution was obtained which could be diluted with water to any desired extent.

EXAMPLE 3

20 parts by weight of N-dioctyl-diethylenetriamine, 30 parts by weight of an addition product of 15 mole of ethylene oxide to 1 mole of oleic acidmonoglyceride, 20 parts by weight of lactic acid, and 20 parts by weight of ethylglycol, as well as 110 parts by weight of water, were homogenized under stirring and heating to 40°C. A clear, slightly foaming solution was obtained.

EXAMPLE 4

10 parts by weight of N-dioctyl-diethylenetriamine, 10 parts by weight of an addition product of 20 mole of ethylene oxide to 1 mole of nonylphenol, 10 parts by weight of tartaric acid, 20 parts by weight of propylene glycol, and 150 parts by weight of water, were homogenized under slight heating. A clear, foaming solution was obtained which could be diluted with water to any desired extent.

EXAMPLE 5

50 parts by weight of N-dioctyl-diethylenetriamine, 25 parts by weight of an addition product of 20 mole of ethylene oxide to 1 mole of laurylalcohol, and 25 parts by weight of a mixed polymerisate of ethylene oxide and propylene oxide with a mole weight of 2000, as well as 30 parts by weight of ethylglycol, were dissolved in 370 parts by weight of water. A clear, slightly foaming solution was obtained which could be diluted with water to any desired extent.

Bacteriological Investigations

The investigation of the bacteriological characteristics was performed according to the Richtlinieder Deutschen Gesellschaft fuer Hygiene und Mikrobiologie (Guidelines of the German Association for Hygiene and Microbiology).

I. Bacteriological Activity of Diocctylethylenetriamine in Suspension Test

1. An aqueous solution was prepared which contained 0.1% of the active substance. The pH was adjusted to a value of 6.5 with acetic acid. This constituted the inventive preparation.

In the following
+ = growth of bacteria
− = no bacteria growth

| Species | Concentration in % | Action time in minutes | | | | | |
|---|---|---|---|---|---|---|---|
| | | 1 | 2 | 5 | 10 | 20 | 30 |
| Staphylococcus aureus | 0.1 | − | − | − | − | − | − |
| | 0.05 | − | − | − | − | − | − |
| | 0.01 | − | − | − | − | − | − |
| | 0.005 | + | + | − | − | − | − |
| | 0.001 | + | + | + | + | − | − |
| Pseudomonas aeruginosa | 0.1 | − | − | − | − | − | − |
| | 0.05 | − | − | − | − | − | − |
| | 0.01 | − | − | − | − | − | − |
| | 0.005 | + | + | − | − | − | − |
| | 0.001 | + | + | + | + | − | − |
| Proteus vulgaris | 0.1 | − | − | − | − | − | − |
| | 0.05 | − | − | − | − | − | − |
| | 0.01 | − | − | − | − | − | − |
| | 0.005 | + | + | − | − | − | − |
| | 0.001 | + | + | + | + | + | − |
| Escherichia coli | 0.1 | − | − | − | − | − | − |
| | 0.05 | − | − | − | − | − | − |
| | 0.01 | − | − | − | − | − | − |
| | 0.005 | + | − | − | − | − | − |
| | 0.001 | + | + | + | + | − | − |

2. A composition was prepared in accordance with the invention which in addition to dioctyldiethylenetriamine contained the same amount by weight of a nonionogenic tenside, which had been obtained by reaction of 12 mole of ethylene oxide with 1 mole of isotridecylalcohol. The pH-value of the aqueous composition containing 0.1% of active substance was adjusted with acetic acid to 6.5.

| Species | Concentration in % | Action time in minutes | | | | | |
|---|---|---|---|---|---|---|---|
| | | 1 | 2 | 5 | 10 | 20 | 30 |
| Staphylococcus aureus | 0.1 | − | − | − | − | − | − |
| | 0.05 | − | − | − | − | − | − |
| | 0.01 | − | − | − | − | − | − |
| | 0.005 | + | − | − | − | − | − |
| | 0.001 | + | + | + | + | − | − |
| Pseudomonas aeruginosa | 0.1 | − | − | − | − | − | − |
| | 0.05 | − | − | − | − | − | − |
| | 0.01 | − | − | − | − | − | − |
| | 0.005 | + | + | − | − | − | − |
| | 0.001 | + | + | + | + | + | − |
| Proteus vulgaris | 0.1 | − | − | − | − | − | − |
| | 0.05 | − | − | − | − | − | − |
| | 0.01 | − | − | − | − | − | − |
| | 0.005 | − | − | − | − | − | − |
| | 0.001 | + | + | + | + | − | − |
| Escherichia coli | 0.1 | − | − | − | − | − | − |
| | 0.05 | − | − | − | − | − | − |
| | 0.01 | − | − | − | − | − | − |
| | 0.005 | − | − | − | − | − | − |
| | 0.001 | + | + | + | − | − | − |

3. Determination of Soap Sensitivity

An aqueous solution was prepared which contained 0.1% of dioctylethylenetriamine. The solution contained additionally 0.1% of soft soap. The dilutions were also admixed with 0.1% of soft soap.

| Species | Concentration in % | Action time in minutes | | | | | |
|---|---|---|---|---|---|---|---|
| | | 1 | 2 | 5 | 10 | 20 | 30 |
| Staphylococcus aureus | 0.1 | − | − | − | − | − | − |
| | 0.05 | − | − | − | − | − | − |
| | 0.01 | + | + | + | + | + | + |
| Pseudomonas aeruginosa | 0.1 | − | − | − | − | − | − |
| | 0.05 | − | − | − | − | − | − |
| | 0.01 | + | + | + | + | + | + |
| Proteus vulgaris | 0.1 | − | − | − | − | − | − |
| | 0.05 | + | − | − | − | − | − |
| | 0.01 | + | + | + | + | + | + |
| Escherichia coli | 0.1 | − | − | − | − | − | − |
| | 0.05 | − | − | − | − | − | − |
| | 0.01 | + | + | + | + | + | + |

4. Determination of Protein Sensitivity

An aqueous solution of dioctylethylenetriamine was prepared in which all the examined dilution stages contained 20% of bovine serum.

| Species | Concentration in % | Action time in minutes | | | | | |
|---|---|---|---|---|---|---|---|
| | | 1 | 2 | 5 | 10 | 20 | 30 |
| Staphylococcus aureus | 0.1 | − | − | − | − | − | − |
| | 0.05 | − | − | − | − | − | − |
| | 0.01 | + | + | + | + | + | + |
| Pseudomonas Aeruginosa | 0.1 | − | − | − | − | − | − |
| | 0.05 | − | − | − | − | − | − |
| | 0.01 | + | + | + | + | + | + |
| Proteus vulgaris | 0.1 | − | − | − | − | − | − |
| | 0.05 | − | − | − | − | − | − |
| | 0.01 | + | + | + | + | + | + |
| Escherichia coli | 0.1 | − | − | − | − | − | − |
| | 0.05 | − | − | − | − | − | − |
| | 0.01 | + | + | + | + | + | + |

II. Bacteriological Activity of Comparison Substances

1. Bacteriological activity of

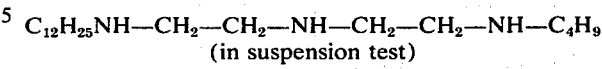
(in suspension test)

The pH value of an aqueous solution containing 0.1% of the active substance was adjusted with acetic acid to 6.5.

| Species | Concentration in % | Action time in minutes | | | | | |
|---|---|---|---|---|---|---|---|
| | | 1 | 2 | 5 | 10 | 20 | 30 |
| Staphylococcus aureus | 0.1 | − | = | − | − | − | − |
| | 0.05 | − | − | − | − | − | − |
| | 0.01 | + | − | − | − | − | − |
| | 0.005 | + | + | + | − | − | − |
| | 0.001 | + | + | + | + | + | + |
| Pseudomonas aeruginosa | 0.1 | − | − | − | − | − | − |
| | 0.05 | − | − | − | − | − | − |
| | 0.01 | + | + | + | + | + | + |
| Proteus vulgaris | 0.1 | − | − | − | − | − | − |
| | 0.05 | − | − | − | − | − | − |
| | 0.01 | + | + | + | − | − | − |
| | 0.005 | + | + | + | + | − | − |
| | 0.001 | + | + | + | + | + | + |
| Escherichia coli | 0.1 | − | − | − | − | − | − |
| | 0.05 | − | − | − | − | − | − |
| | 0.01 | + | − | − | − | − | − |
| | 0.005 | + | + | + | − | − | − |
| | 0.001 | + | + | + | + | + | + |

Bacteriological Activity of

2. Lauryldiethylenetriamine and
3. Dilaurylethylenetriamine in suspension test

The pH value of the aqueous preparation containing 0.1% of active compound and 0.1% of nonionogenic tenside, was adjusted to 6.5. The non-ionogenic tenside was obtained by addition of 12 mole of ethylene oxide to 1 mole of isotridecylalcohol.

| Species | Concentration in % | 2) Action time in minutes | | | | | | 3) Action time in minutes | | | | | |
|---|---|---|---|---|---|---|---|---|---|---|---|---|---|
| | | 1 | 2 | 5 | 10 | 20 | 30 | 1 | 2 | 5 | 10 | 20 | 30 |
| Staphylococcus aureus | 0.1 | − | − | − | − | − | − | − | − | − | − | − | − |
| | 0.05 | − | − | − | − | − | − | + | + | − | − | − | − |
| | 0.01 | + | − | − | − | − | − | + | + | + | + | − | − |
| | 0.005 | + | + | − | − | − | − | + | + | + | + | − | − |
| | 0.001 | + | + | + | + | + | + | + | + | + | + | + | + |
| Pseudomonas aeruginosa | 0.1 | − | − | − | − | − | − | − | − | − | − | − | − |
| | 0.05 | − | − | − | − | − | − | + | + | + | − | − | − |
| | 0.01 | + | + | − | − | − | − | + | + | + | + | + | + |
| | 0.005 | + | + | + | − | − | − | + | + | + | + | + | + |
| | 0.001 | + | + | + | + | + | + | + | + | + | + | + | + |
| Proteus vulgaris | 0.1 | − | − | − | − | − | − | + | + | + | + | + | + |
| | 0.05 | − | − | − | − | − | − | + | + | + | + | + | + |
| | 0.01 | + | + | + | + | − | − | + | + | + | + | + | + |
| | 0.05 | + | + | + | + | + | − | + | + | + | + | + | + |
| | 0.001 | + | + | + | + | + | + | + | + | + | + | + | + |
| Escherichia coli | 0.1 | − | − | − | − | − | − | − | − | − | − | − | − |
| | 0.05 | − | − | − | − | − | − | + | + | + | − | − | − |
| | 0.01 | + | + | + | − | − | − | + | + | + | + | + | + |
| | 0.005 | + | + | + | + | − | − | + | + | + | + | + | + |
| | 0.001 | + | + | + | + | + | + | + | + | + | + | + | + |

4. Bacteriological Activity of $C_8H_{17}NH-CH_2-CH_2-NH-CH_2-CH_2-NH_2$ and $C_8H_{17}NH-CH_2-CH_2-NH-CH_2-CH_2-NH-CH_2COOH$ Under the conditions of the suspension test, aqueous solutions of the above comparison compounds, at the same pH value as in the inventive compositions, do not exhibit any bacteriological effect. This applies to the comparison substances per se and also in the presence of non-ionogenic tensides.

5. The bacteriological effect of a commercially available quaternary ammonium compound (N-dimethyl-alkyl-benzyl-ammonium-chloride) whose alkyrest consists to 50% by weight of a carbon chain with 14 atoms, to 40% by weight of a carbon chain with 12 carbon atoms, and 10% by weight of a chain with 16 carbon atoms.

a. in the presence of 20% bovine serum
b. in the presence of 0.1% potassium soap.

Comparison of the bacteriological activity of the inventive compositions, as they are listed under I.1 and I.2 with that of the comparison substances according to II.1 through II.4, indicates clearly the superiority of the inventive composition in the normal suspension test. The superiority of the inventive compounds under conditions simulating practical conditions, to wit, in the presence of anionic detergents and proteins, is clear from the tests I.3 and I.4 if compared with the prior art compounds as represented by the quaternary ammonium compound according to II.5. It will be noted that the prior art compounds are much more sensitive than the inventive compounds.

We claim:

1. A method of inhibiting the growth of bacteria, which comprises applying to the locus to be protected a bactericidal composition consisting essentially of a bactericidally effective amount of the compound N-dioctyl-diethylenetriamine and an acid in an amount sufficient to impart to the composition a pH value of between about 5 − 8, and an inert carrier.

| Species | Concentration in % | a) Action time in minutes | | | | | | b) Action time in minutes | | | | | |
|---|---|---|---|---|---|---|---|---|---|---|---|---|---|
| | | 1 | 2 | 5 | 10 | 20 | 30 | 1 | 2 | 5 | 10 | 20 | 30 |
| Staphylococcus aureus | 0.1 | − | − | − | − | − | − | − | − | − | − | − | − |
| | 0.05 | − | − | − | − | − | − | + | + | − | − | − | − |
| | 0.01 | + | + | + | + | + | + | + | + | + | + | + | + |
| Pseudomonas aeruginos | 0.1 | + | + | + | + | + | − | + | + | − | − | − | − |
| | 0.05 | + | + | + | + | + | + | + | + | + | + | + | + |
| | 0.01 | + | + | + | + | + | + | + | + | + | + | + | + |
| Proteus vulgaris | 0.1 | + | − | − | − | − | − | + | − | − | − | − | − |
| | 0.05 | + | + | + | + | + | + | + | + | + | + | + | + |
| | 0.01 | + | + | + | + | + | + | + | + | + | + | + | + |
| Escherichia coli | 0.1 | − | − | − | − | − | − | − | − | − | − | − | − |
| | 0.05 | + | + | + | + | − | − | + | + | + | + | + | − |
| | 0.01 | + | + | + | + | + | + | + | + | + | + | + | + |

2. A method as claimed in claim 1, wherein the acid is selected from the group consisting of acetic acid, hydrochloric acid, phosphoric acid, lactic acid, tartaric acid, citric acid, gluconic acid, and nitric acid.

3. A method as claimed in claim 1, wherein said inert carrier is water, alcohol, ethyl ether of ethylene glycol or propylene glycol.

4. A method as claimed in claim 1, wherein the concentration of said compound in the composition is between about 0.001 to 0.1 per cent by weight.

5. A method of inhibiting the growth of bacteria, which comprises applying to the locus to be protected a bactericidal composition consisting essentially of a bactericidally effective amount of the compound N-dioctyl-diethylenetriamine, an acid in an amount sufficient to impart the composition a pH value of between 5 – 8, an inert carrier and a non-ionogenic tenside.

* * * * *